(12) United States Patent
Schaper et al.

(10) Patent No.: US 7,089,765 B2
(45) Date of Patent: Aug. 15, 2006

(54) METHOD OF MAKING A JACKETED PREFORM FOR OPTICAL FIBERS USING OVD

(75) Inventors: Hartwig Schaper, Aschaffenburg (DE); Norbert Treber, Hanau (DE); Oliver Humbach, Seligenstadt (DE); Uwe Haken, Mömbris (DE); Donald Paul Jablonowski, Dunwoody, GA (US)

(73) Assignees: Heraeus Tenevo GmbH, Hanau (DE); Furukawa Electric North America, Inc., Norcross, GA (US)

( * ) Notice: Subject to any disclaimer, the term of this patent is extended or adjusted under 35 U.S.C. 154(b) by 40 days.

(21) Appl. No.: 10/151,846

(22) Filed: May 20, 2002

(65) Prior Publication Data

US 2002/0136515 A1    Sep. 26, 2002

Related U.S. Application Data

(63) Continuation of application No. 09/440,413, filed on Nov. 15, 1999, now abandoned.

(30) Foreign Application Priority Data

Nov. 16, 1998    (DE) ................... 198 52 704

(51) Int. Cl.
  *C03B 37/018*    (2006.01)
(52) U.S. Cl. ................ 65/397; 65/398; 65/412; 65/417; 65/421; 65/428; 65/427; 65/422
(58) Field of Classification Search ........... 65/377, 65/398, 397, 417, 418, 419, 420, 412, 421, 65/428, 427, 422
  See application file for complete search history.

(56) References Cited

U.S. PATENT DOCUMENTS

| | | | |
|---|---|---|---|
| 3,753,672 A | | 8/1973 | Curtiss |
| 3,932,162 A | | 1/1976 | Blankenship |
| 4,217,027 A | * | 8/1980 | MacChesney et al. ...... 385/123 |
| 4,335,934 A | | 6/1982 | Black et al. |
| 4,372,647 A | | 2/1983 | Okamoto et al. |
| 4,385,802 A | | 5/1983 | Blaszyk et al. |
| 4,435,040 A | | 3/1984 | Cohen et al. |
| 4,439,007 A | | 3/1984 | Lazay et al. |
| 4,447,127 A | | 5/1984 | Cohen et al. |
| 4,691,990 A | | 9/1987 | Cohen et al. |
| 4,691,991 A | | 9/1987 | Unger |
| 4,715,679 A | | 12/1987 | Bhagavatula |
| 4,804,247 A | * | 2/1989 | Kyoto et al. ................. 385/142 |
| 4,820,322 A | * | 4/1989 | Baumgart et al. .............. 65/412 |
| 4,896,942 A | * | 1/1990 | Onstott et al. ............... 385/127 |
| 4,950,319 A | * | 8/1990 | Lane et al. .................... 65/508 |
| 5,221,309 A | * | 6/1993 | Kyoto |
| 5,513,983 A | * | 5/1996 | Ito et al. ....................... 432/205 |
| 5,609,666 A | * | 3/1997 | Heitmann .................... 65/421 |
| 5,837,334 A | | 11/1998 | Yokokawa et al. |
| 5,917,109 A | | 6/1999 | Berkey |
| 6,109,065 A | * | 8/2000 | Atkins et al. .................. 65/399 |

FOREIGN PATENT DOCUMENTS

| | | |
|---|---|---|
| EP | 0 249 230 | 12/1987 |
| EP | 0 434 237 | 6/1991 |
| EP | 0 598 554 A1 | 11/1993 |
| EP | 0 775 924 A2 | 11/1996 |
| EP | 0 762 159 | 3/1997 |
| EP | 0 767 147 A1 | 4/1997 |
| EP | 0 785 448 | 7/1997 |
| EP | 1 000 909 | 5/2000 |
| WO | 99/40037 | 8/1999 |

OTHER PUBLICATIONS

Patent Abstracts of Japan JP 63 222031 A, vol. 13, No. 15, published Sep. 14, 1988, (Sumitomo Electric Ind. Ltd.).
Patent Abstracts of Japan JP 01 160840 A, vol. 13, No. 423, published Jun. 23, 1989, (Sumitomo Electric Ind. Ltd.).

* cited by examiner

*Primary Examiner*—John Hoffmann
(74) *Attorney, Agent, or Firm*—Tiajoloff & Kelly

(57) ABSTRACT

On the basis of a known process for the production of a preform for an optical fiber for optical data transmission technology, the productivity of the process for the production of complex refractive index profiles is to be improved by providing a quartz glass substrate tube which exhibits different doping in radial direction, introducing a core glass made of synthetic quartz glass into the substrate tube and covering the substrate tube with a jacket tube. A substrate tube suitable therefor is also being provided which tube requires less core glass material for the production of the preform, whether during the internal deposition or for the core glass rod in the rod-in-tube technique. Regarding the process it is proposed according to the invention that a substrate tube be used which was obtained by vitrification of a porous tube-shaped $SiO_2$ blank, the substrate tube being provided with a core glass layer which is produced in that to the first radial portion of the $SiO_2$ blank there is added before the vitrification a first dopant which increases the refractive index of quartz glass. The substrate tube according to the invention has in the radial direction regions of different doping whereby it incorporates a core glass layer which has a refractive index of at least 1.459.

43 Claims, 3 Drawing Sheets

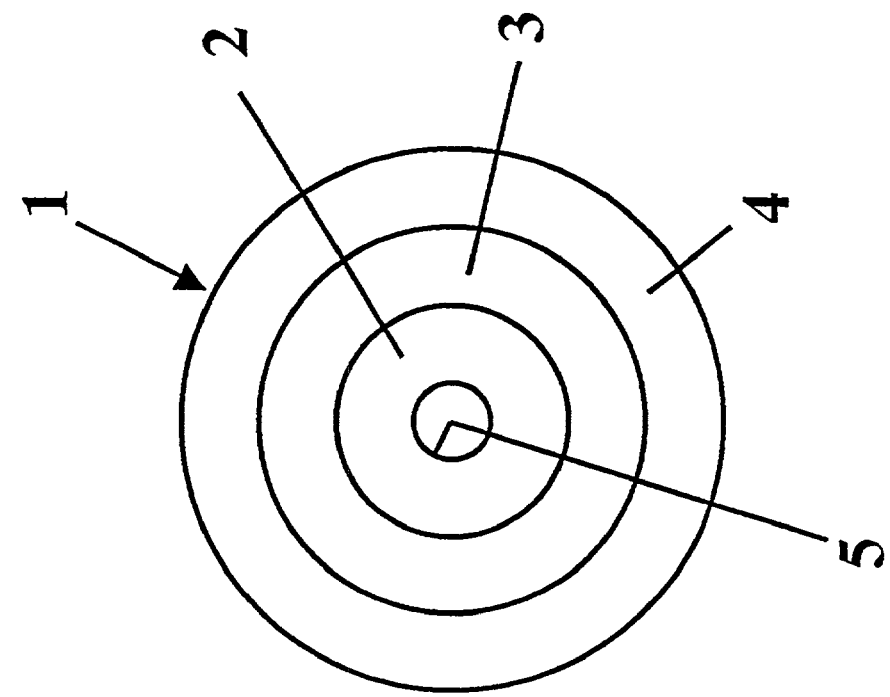
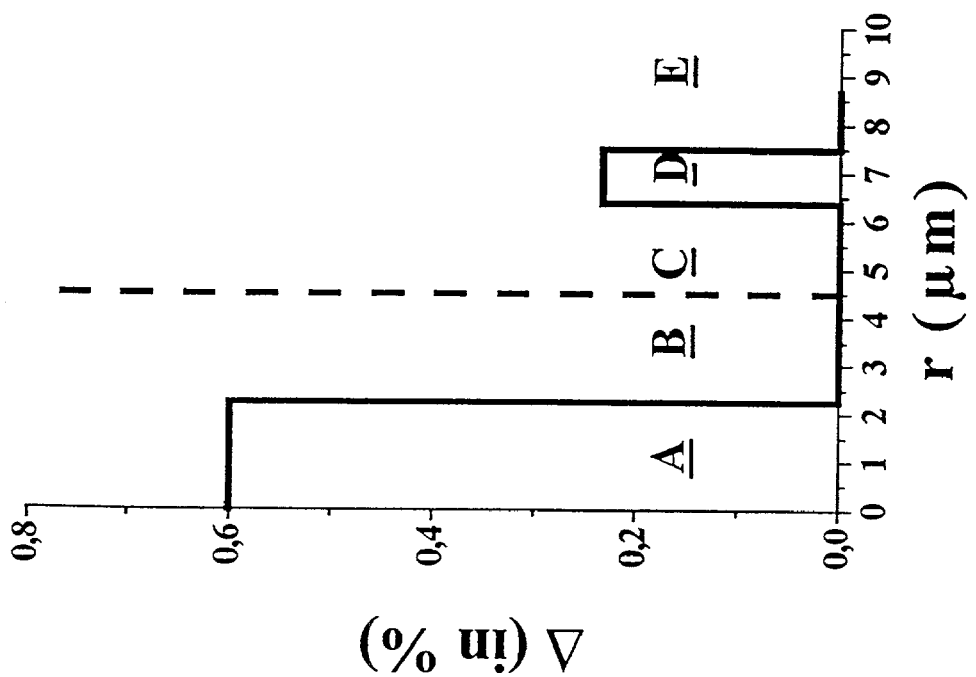
Fig. 1b
Fig. 1a

METHOD OF MAKING A JACKETED PREFORM FOR OPTICAL FIBERS USING OVD

RELATED APPLICATIONS

This application is a continuation of U.S. patent application Ser. No. 09/440,413 filed Nov. 15, 1999, now abandoned

FIELD OF THE INVENTION

The invention concerns a process for the production of a preform for an optical fiber for optical data transmission technology, by providing a substrate tube of quartz glass which tube has different dopants in radial progression, by introducing a core glass of synthetic quartz glass, and by surrounding the substrate tube with a jacket tube.

Furthermore, the invention concerns a substrate tube of quartz glass for the production of a preform for an optical fiber for optical data transmission technology, where the preform comprises a core glass which is surrounded by a mantle region of which region at least a part is provided in form of the substrate tube which tube has different dopants in radial direction.

DISCUSSION OF THE PRIOR ART

In general, preforms for optical fibers have a core which is surrounded by a cladding of a material which has a lower refractive index. Leading processes for the production of the preform core from synthetic quartz glass are those designated VAD (vapor-phase axial deposition), OVD (outside vapor-phase deposition), MCVD (modified chemical vapor-phase deposition), and PCVD (plasma chemical vapor-phase deposition). In all these processes the core is produced in that $SiO_2$ particles are deposited on a substrate and vitrified. The deposition of the core in the VAD and OVD processes takes place from the outside onto a substrate; in the MCVD and PCVD processes it takes place on the inside of the so-called substrate tube. The substrate tube may form the optically active cladding or a part of it. Depending on the fiber design the substrate tube is composed of doped or undoped quartz glass. In addition, production of preforms is known according to the so-called rod-and-tube approach where a rod made of a core glass is introduced into a jacket tube and is fused with the latter. Optical fibers are obtained from the preform by elongating it.

Depending on the process, the cladding glass is produced in a separate process (OVD, MCVD, plasma process, rod-and-tube process) or the cladding glass and the core glass are produced at the same time, as is common in the so-called VAD process. The refraction index differential between core glass and cladding glass is adjusted by adding suitable dopants. It is known that fluorine and boron lower the index of refraction while a plurality of dopants is suitable for the increase of the refractive index, especially germanium, phosphorus and titanium.

In a simple optical fiber design, the core made of a quartz glass having a first index of refraction is surrounded by a mantle made of a quartz glass having a second, lower index of refraction. However, in the course of optimization of optical fibers, in particular for the simultaneous transmission of several wavelengths and for higher transmission rates, fiber designs are being developed which have substantially more complex refractive index profiles. For example, EP-A1 785,448 describes an optical fiber of quartz glass which has a fiber design called "double-core+double cladding" which is supposed to reduce the so-called polarization-mode dispersion.

A process for the production of a preform and a substrate tube suitable therefor of the kind described in the beginning are known from EP-A2 434,237. It describes the production of an optical single-mode fiber which is there called the "depressed-clad-type." The preform for this fiber is produced by internal deposition (MCVD process). For this, an inner-cladding glass layer of fluorine-doped quartz glass is first deposited on the inner wall of a substrate tube, followed by a core glass layer of Ge-doped quartz glass. The quartz glass substrate tube used there may have areas of varying levels of fluorine doping across the thickness of its wall. The tube thus coated on the inside is collapsed, and is subsequently surrounded with a so-called "jacket tube" made of a jacket glass, forming a preform.

Even though production of dispersion-shifted or so-called dispersion-compensating optical fibers is possible by means of the known process, it would be necessary to build up a plurality of internal layers in the known substrate tube.

In the course of the MCVD deposition the increasing number of layers and their thickness leads to a corresponding decrease of the inside diameter of the substrate tube and with it to a reduction of the inner surface. Therefore the effectiveness of the deposition decreases during the progress of the process. This can be counteracted only to a limited degree by increasing the inner diameter because the temperature necessary for the deposition is usually created by external heating. However, an increase of the inner diameter or wall thickness of the substrate tube requires an increase of the external temperature in order to maintain the deposition conditions on the inside of the substrate tube. But this is limited due to the softening and the plastic deformation of the substrate tube. Moreover, the collapsing becomes increasingly difficult with thick-walled or large substrate tubes and with thick inner layers.

SUMMARY OF THE INVENTION

Therefore the object of the invention is to provide an effective and economical process for the production of a preform whereby complex refractive index profiles may be produced in a highly productive manner, and to provide a substrate tube suitable therefor, in which substrate tube less core glass material is needed, either for the internal deposition process or for the core glass rod in the rod-in-tube process.

As concerns the process the object is accomplished on the basis of the process described in the beginning in that a substrate tube is used which is obtained by the vitrification of a tube-shaped porous $SiO_2$ blank which is provided with a core glass layer, the latter having been produced by adding, before the vitrification, to a first radial portion of the $SiO_2$ blank a first dopant which increases the refractive index of quartz glass.

The substrate tube used for the process comprises a core glass layer. By this is meant a radial portion of the entire wall thickness of the substrate tube, a generally cylindrical portion with, i.e., an annular cross-section that has a thickness that extends in the radially outward direction of the substrate tube, which portion contains a dopant which increases the refractive index of quartz glass. Such dopants contain for example germanium, phosphorus, chlorine, erbium or titanium. Commonly the refractive index of the core glass layer is therefore higher than that of undoped quartz glass. The refractive index of undoped quartz glass is indicated in literature as being between $n_D=1.4585$ and 1.4589 at a measurement wavelength of 589.3 nm (D-line of the sodium vapor lamp). The substrate tube may have one or several core glass layers. In addition to the core glass layer at least one additional layer is provided which in its doping differs from the core glass layer. When viewed across the wall thickness the substrate tube thus has several layers having different doping. These layers are not produced by for example joining together several differently doped tubes or by depositing glass layers on the surface of a quartz glass tube, but directly during manufacture or in subsequent treatment of the porous blank. The substrate tube is obtained by vitrification of the $SiO_2$ blank.

The core glass layer comes from a radial portion of the porous blank to which had been added before vitrification a first dopant which increases the refractive index of quartz glass. The $SiO_2$ blank is commonly produced by flame hydrolysis of a silicon-containing compound and deposition of $SiO_2$ particles on a substrate according to the so-called 'soot process.' The vitrification of the porous $SiO_2$ blank is accomplished—in contrast to the so-called direct vitrification—in a separate sintering process. Due to its porosity the $SiO_2$ blank is easily treated before vitrification such as for example for the purpose of cleaning, drying or additional doping. The drying of the porous $SiO_2$ blank makes it possible to manufacture core glass layers of low OH-content.

Instead of doping selected portions, the $SiO_2$ blank can also first have the first dopant distributed homogeneously throughout its entire wall thickness whereby in a later process step the first dopant is at least partially removed from a radial portion, or the refractive index increase caused by the first dopant is entirely or partially compensated or even overcompensated by a second dopant. The distribution of the dopant in the core glass layer can be homogenous, it can also have a gradient, a maximum, or a minimum.

A chemical or mechanical further treatment of the vitrified blank can take place to set a predetermined surface quality or geometry of the substrate tube, for example by etching or polishing of the surface as well as by elongation to the desired final dimension. In the event that the remaining core glass is made by inner deposition (MCVD or PCVD) in the substrate tube, the substrate tube and core glass combination resulting after inner deposition is collapsed. At the same time additional cladding glass in form of a so called jacket tube can be added and the optical fiber drawn. In the event that the remaining core glass is added to the substrate tube in form of a core glass rod the resulting combination of substrate tube and core glass rod are fused together whereby additional cladding glass can be added in the form of outer tubes (jacket tubes). In case the substrate tube already has appropriate dimensions, an additional jacket might not be necessary.

From the preform made according to the invention an optical fiber for data transmission can be obtained where the core glass layer contributes to light transmission. The at least one core glass layer is commonly part of a complex refractive index profile. To that extent portions of the preform are provided by the substrate tube which in the known processes is not produced until the core glass itself is produced. The substrate tube itself can be produced by a more economical and more productive OVD process. Insofar the invention replaces expensive and low-effectiveness production processes for the core regions of optical fibers by a more productive manner of manufacture. For example, the core glass layer provided by the substrate tube in the MCVD process would have to be additionally produced by inner coating of the substrate tube. The number and thickness of the inner layers would increase correspondingly while the above-listed disadvantages relating to effectiveness of the deposition would have to be accepted. By contrast, in the process according to the invention, a part of the light transmitting layers is provided by the substrate tube. In this way a productive and effective production of large-volume preforms having complex refractive index profiles is being made possible. The core glass layer provided by the substrate tube contributes to the transmission of light and thus belongs to the core region of the optical fiber. The amount of additional core glass that needs to be added is thus reduced, where "core glass" in the sense of the invention describes that quartz glass material which is needed to complete the core region. The process according to the invention is primarily suitable for the production of single-mode fibers but is also suitable for the production of multi-mode fibers.

In a preferred practice of the process the porous $SiO_2$ blank is formed by flame hydrolysis of a silicon compound and deposition of $SiO_2$ particles on a carrier whereby the first dopant is added during the deposition. In this case the substrate tube—including the core glass layer—is produced according to the OVD process. The adding of the first dopant takes place during the deposition of the $SiO_2$ particles by adding the dopant as such or in form of a chemical compound to the silicon compound, or by maintaining an atmosphere which contains the first dopant. A non-homogenous distribution of the refractive index across the wall thickness of the $SiO_2$ blank can be achieved by changing over time the effective concentration of the dopant or the temperature, by subsequent removal of the first dopant from a portion of the $SiO_2$ blank, or by partial compensating using another dopant.

The core glass can be introduced into the substrate tube by means of the rod-in-tube method or by inner deposition (MCVD and PCVD), whereby the latter variant is preferred because it simplifies the production of highly pure, especially low-OH, inner layers.

Especially effective is implementation of the process where at least one second radial portion of the porous $SiO_2$ blank is doped, after deposition and before vitrification, with a second dopant which alters the refractive index of quartz glass. The second dopant can be distributed homogeneously across the wall thickness of the $SiO_2$ blank. Such distribution of the second dopant can be realized especially simply and economically by impregnation of the $SiO_2$ blank with a liquid containing the second dopant or by gas phase diffusion. This facilitates the creation of complex refractive indexes. After vitrification the core glass layer can comprise a mix of a first dopant and a second dopant.

The doping of the second radial region takes place advantageously by heating of the $SiO_2$ blank whereby it is exposed to an atmosphere which contains the second dopant. This process (hereinafter called 'the gas phase doping process') makes possible a particularly effective and homogenous doping of the $SiO_2$ blank with a second dopant.

Fluorine is preferably used as the second dopant. Fluorine reduces the refractive index of quartz glass. The doping of the porous $SiO_2$ blank or one of its radial regions with fluorine simplifies the manufacture of a substrate tube with a complex refractive index profile. Thus after vitrification the substrate tube can have a cladding layer which has a lower refractive index than quartz glass. Such a substrate tube is particularly suitable for the production of a dispersion-compensating single mode optical fiber (so-called DC fiber). The refractive index profile of this fiber generally comprises a region with a low refractive index and a region with a high refractive index. In comparison with known processes the manufacture of such fibers using the process according to the invention is particularly effective and simple in that both regions can be made available entirely, or at least partially, by way of the substrate tube.

Advantageously, a chemical compound containing germanium is used as the first dopant. Germanium is present in quartz glass in form of germanium oxide, $GeO_2$. Because of its transmission properties germanium oxide is particularly suitable for transmission of light waves in the infrared spectrum.

It has been shown to be useful to adjust the refractive index of the core glass layer in a range from 1.4593 to 1.490. This permits a particularly economical and effective manufacture of optical fibers having a broad modal field band, especially at a transmission wavelength around 1550 nm. What is meant by the core glass layer is the radial portion of the substrate tube which has a refractive index within the range indicated above. The refractive index may be the same over the entire thickness of the core glass layer, but it may also take any course.

As far as the substrate tube is concerned, the above-indicated object is achieved on the basis of the substrate tube described initially in that the substrate tube comprises a core glass layer with a refractive index of at least 1.459.

The substrate tube comprises a core glass layer. By this is meant a radial portion of the entire wall thickness of the substrate tube, which has a refractive index of at least 1.459. The refractive index, measured at a wavelength of 589.3 nm, is thus higher than that of undoped quartz glass which is indicated in the literature at between 1.4585 and 1.4589. The substrate tube may have one or more core glass layers. In addition to the core glass layer at least one additional layer is provided which differs from the core glass layer in its doping. Viewed across its wall thickness the substrate tube thus has several layers of different doping. These layers are not made by for example the joining of several differently doped tubes or by the deposition of glass layers on the surface of quartz glass tube, but instead directly during manufacture or during subsequent treatment of a porous $SiO_2$ blank. The substrate tube is obtained—as described above—through the vitrification of the $SiO_2$ blank which is commonly manufactured by flame hydrolysis of a silicon-containing compound and deposition of $SiO_2$ particles on a substrate according to the so-called "soot process". The vitrification of the porous $SiO_2$ blank takes place—in contrast to the so-called "direct vitrification"—in a separate sintering process.

In an optical fiber which is obtained from a preform made by using a substrate tube, the core glass layer contributes to the transmission of light whereby it is usually part of a complex refraction index profile. Therefore regions of the preform are provided by the substrate tube which otherwise in the known processes is manufactured at great expense during the production of the core glass. This facilitates the effective production of large-volume preforms with complex refractive index profiles. The substrate tube itself can be made by means of a more economical and more productive OVD process. In this case the core glass layer provided by substrate tube contributes to the transmission of light and in this respect belongs to the core region of the optical fiber. The amount of core glass to be additionally added is thus reduced.

The substrate tube according to the invention may be used for the production of a preform for optical single-mode fibers and also for multi-mode fibers. In any event, a core glass is introduced into the substrate tube. This normally occurs according to the MCVD or the PCVD process by means of deposition of quartz glass layers on the inner wall of the substrate tube and the subsequent collapsing of the substrate tube which is coated on the inside. The substrate tube according to the invention is also suitable for the manufacture of a preform by means of the rod-in-tube technique. A chemical or mechanical treatment may be necessary to adjust the required surface quality or geometry, for example by means of etching and polishing of the surfaces or by elongation of the substrate tube to the desired final dimensions.

Attention is directed in this regard to the preceding detailed explanation related to the production of a preform according to the invention.

Advantageously, the core glass layer is provided adjoining to the core glass of the preform. Here, a substantial portion of the light-transmitting region of the preform is provided by the substrate tube whereby the core glass layer may form a part of a homogeneously doped, central core glass region, or a part of a complex refractive index profile. In either case the refractive indexes of the core glass layer and the adjoining core glass may be identical or different.

It has been shown to be particularly useful if the substrate tube comprises a cladding glass layer made of fluorine-doped quartz glass. Such a substrate tube is particularly suitable for the manufacture of a dispersion-compensating single-mode optical fiber (so-called DC fiber). The refraction index profile of this fiber generally has a region having a low refractive index and a region having a high refractive index. Compared to the known processes the manufacture of such fibers by means of the process according to the invention is particularly effective and simple whereby both regions can be made available completely or at least partially by the substrate tube.

Advantageously, the core glass layer contains germanium. Germanium increases the refraction index of quartz glass whereby it is present in the core glass in form of $GeO_2$. Due to its transmission properties, germanium oxide is particularly suitable for the transmission of light wavelengths in the infrared spectrum.

A core glass layer with a refractive index in the range from 1.4593 to 1.490 has been shown to be advantageous. A substrate tube of such kind permits a particularly economical and effective production of optical fibers having a broad mode field range at a transmission wave length around 1550 nm. What is meant here by a core glass layer is the radial portion of the substrate tube which has a refractive index falling into the above range, independent of whether the refraction index is the same throughout the entire thickness of the core glass layer or takes a different course.

It is advantageous, especially in respect to low loss in the infrared wavelength region of fibers manufactured using substrate tubes according to the invention, if the hydroxyl ion content of the core glass layer is max. 1 ppm by weight. Since hydroxyl groups have an absorbing effect in the infrared wavelength region, a low OH content is particularly important in optical fibers in which great value is placed on low loss in this wavelength region. This is true for example for transmission wavelengths around 1310 nm, around 1550 nm, or in a wavelength range inbetween, as are used in optical data transmission technology.

A particularly well proven embodiment of the substrate tube according to the invention is one where a diffusion-blocking layer is provided adjoining to the core glass layer. The diffusion-blocking layer facilitates the manufacture of step-wise refraction index profiles in that it impedes the undesired diffusion of the dopant into portions beyond the diffusion-blocking layer during later treatment of the porous $SiO_2$ blank in a dopant-containing atmosphere. Several diffusion-blocking layers may also be present. The diffusion-blocking layer is formed in an easy manner by for example compressing some regions of the $SiO_2$ blank during the deposition.

BRIEF DESCRIPTION OF THE DRAWINGS

The invention will be explained in more detail below by exemplary embodiments and a drawing. In particular, the drawing shows schematically in FIG. 1a, a first refractive index profile of an optical single-mode fiber which was obtained from a preform produced according to the invention; in FIG. 1b, a substrate tube according to the invention for the production of a fiber having a refractive index profile according to FIG. 1a; in FIG. 2b, a further embodiment of substrate tube according to the invention for the production of a fiber having a refractive index profile according to FIG. 2a; in FIG. 3a, a third refractive index profile of an optical single-mode fiber which was obtained from a preform produced according to the invention; and in FIG. 3b, a further embodiment of a substrate tube according to the invention for the production of a fiber having a refractive index profile according to FIG. 3a.

DETAILED DESCRIPTION

Figure 2B:
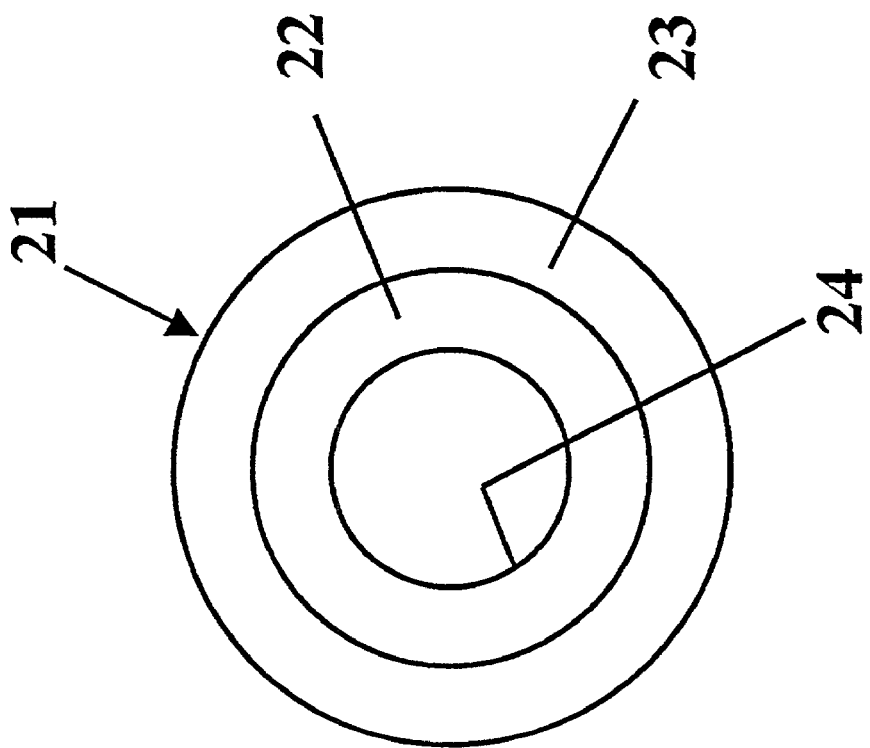

In the refractive index profiles described below in more detail on the basis of FIGS. 1a, 2a and 3a, the y-axis in each case indicates a relative refractive index differential $\Delta=(n1-n2)/n2$ [in %], where n1 refers to the absolute refraction index in the corresponding light transmitting region of the optical fiber. The reference point n2 corresponds to the refraction index in the outer mantle region of each fiber and is in the subsequent exemplary embodiment always 1.4589 at 589.3 nm. The fiber radius is indicated in µm on the x-axis.

The refractive index according to FIG. 1a is typical for a so-called LEAF fiber (large effective area fiber). Such a fiber is described in EP-A2 775 924. The refractive index profile, in comparison to a dispersion-shifted fiber, leads to an enlarged mode field diameter and thus to a lower average energy density in the optical fiber. This is desirable for the reduction of nonlinear effects such as the so-called self-phase modulation (SPM). Furthermore, the profile causes a lower dispersion increase.

The refractive index profile is distinguished by a total of five core segments. In the inner core segment A with a diameter of about 4.5 µm (radius of 2.25 µm), the relative refractive index differential is $\Delta=0.6$. In the outwardly adjoining core segment B which has a layer thickness of 2.25 µm, the refractive index differential is $\Delta=0$ (there n1=n2). The core segment B is followed by the core segment C which has a thickness of 1.875 µm and a relative refractive index differential of $\Delta=0$. The relative refractive index differential of the core segment D is $\Delta=0.234$ and its thickness is 1.125 µm. The core segment D is in turn enclosed by a core segment E which has a relative refractive index differential of $\Delta=0$ and a thickness of 1.18 µm. The core segment E is followed by the outer optical region of the fiber, made of undoped quartz glass.

The core segments C, D and E are provided by the substrate tube according to the invention, the core segments A and B are produced in the substrate tube by internal deposition. The boundary surface between the core segments B and C is indicated by a broken line in FIG. 1a.

The substrate tube used for the fiber with such a refractive index profile is shown schematically in FIG. 1b. The substrate tube 1 has an outer diameter of 25 mm and a total wall thickness of 3 mm. The inner layer 2 of the substrate tube 1 is made of undoped quartz glass with a refractive index of about 1.4589 at 589.3 nm. The thickness of the inner layer 2 is 1.21 mm. It is adjoined by an intermediate layer 3 which is doped with about 3% by weight of $GeO_2$, which results in the above-mentioned increase of the normal refraction index of $\Delta=0.234$ in the core segment D. The layer thickness of the intermediate layer 3 is 0.84 mm. The outer layer 4 of the substrate tube 1 which has a thickness of 0.95 mm is in turn made of undoped quartz glass. As far as concerns the refractive index profile of the optical fiber obtained by using the substrate tube 1, the core segment C corresponds to the inner layer 2, the core segment D to the intermediate layer 3, and the core segment E to the outer layer 4.

The substrate tube 1 is produced according to the OVD process. According to the known process, $SiO_2$ particles are produced by means of flame hydrolysis of $SiCl_4$ and are deposited in layers on a rotating mandrel. The Ge-doped intermediate layer 3 is obtained in that during the deposition of the intermediate layer $GeCl_4$ is added to $SiCl_4$. A porous $SiO_2/GeO_2$ soot body is obtained. In order to remove hydroxyl groups to a level of under 30 ppb by weight the soot body thus produced is subjected to chlorine treatment at increased temperature. Thereupon the porous $SiO_2$ soot body is vitrified under formation of a hollow cylinder. The surfaces of the hollow cylinder are mechanically smoothed and then chemically etched. The hollow cylinder pretreated in this way is then elongated to the final dimensions of the substrate tube.

In order to produce the preform for the optical fiber with the refractive index profile represented in FIG. 1, the inner walls 5 of the substrate tube 1 as shown in FIG. 1b are first coated by means of the MCVD process with an undoped $SiO_2$ layer to a thickness of about 1.01 mm and simultaneously directly vitrified. Then a Ge doped layer with a thickness of 0.37 mm is produced in that $GeCl_4$ is added to the starting material in such a way that a quartz glass is produced with a germanium concentration of about 9% by weight. The resulting refractive index is about $9\times10^{-3}$ which corresponds to the core segment A shown on FIG. 1a.

Then the internally coated substrate tube is collapsed. The core rod thus produced has an outer diameter of 19 mm. It is then covered by an outer tube (jacket) of undoped quartz glass. The preform thus produced has an outer diameter of about 137 mm. From it are drawn optical fibers having an outer diameter of 125 µm and a refractive index profile of the core region as shown in FIG. 1.

Figure 2A:
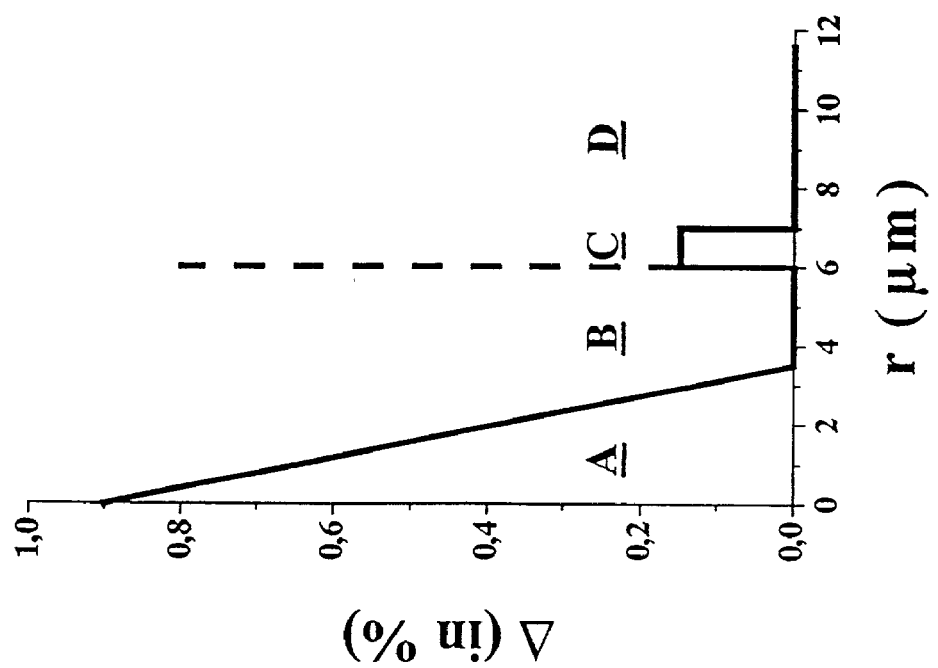
in FIG. 2a, a second refractive index profile of an optical single-mode fiber which was obtained from a preform produced according to the invention.

The refractive index profile according to FIG. 2a shows a variant of the fiber design shown in FIG. 1a. This refractive index profile also results in an increased mode field diameter and thus to a lower average light intensity in the optical fiber. Such a fiber is also described in the EP-A2 775,924.

The refractive index profile according to FIG. 2a has a total of four core segments. In the core segment A which has a diameter of about 7 µm (radius of 3.5 µm), the relative refractive index differential $\Delta$ declines linearly from a maximum of 0.9 (corresponding to about $13\times10^{-3}$ over n2, where n2=1.4589) to 0 (zero). In the next core segment B which has a layer thickness of 2.5 µm the relative refractive index differential Δ=0 (the absolute refractive index there=n2). The third core segment C has a layer thickness of 1 µm within which the relative refractive index differential is set at 0.1485. In the next outwardly following fourth core segment D the relative refractive index differential is again n2 and the layer thickness is 4.08 µm.

The core segments C and D are provided by a substrate tube according to the invention. In this substrate tube the core segments A and B are made by internal deposition. The boundary surface between the outer and inner portion of the core segments is shown by a broken line in FIG. 2a.

The substrate tube used to produce the fiber with a refractive index profile according to FIG. 2a is shown schematically in FIG. 2b. The substrate tube 21 has an outer diameter of 25 mm and a total wall thickness of 3 mm. The inner layer 22 of the substrate tube 21 is of Ge-doped quartz glass. The thickness of the inner layer 22 is about 0.45 mm, the concentration of the germanium is about 2% by weight, which results in a refractive index increase in the core segment C, shown in FIG. 2a. The outer layer 23 of the substrate tube 21 has a thickness of 2.55 mm and is in turn again composed of undoped quartz glass. In the case of the refractive index profile of the fiber obtained by using the substrate tube 21 the core segment C is thus formed from the inner layer 22, and the core segment D from the outer layer 23.

The substrate tube 21 is produced according to the OVD process. According to the known process, $SiO_2$ particles are produced by means of flame hydrolysis of $SiCl_4$ and are deposited in layers on a rotating mandrel. The germanium-doped inner layer 22 is obtained in that during the deposition of the inner layer 22 $GeCl_4$ is added to $SiCl_4$. After a Ge-doped soot material layer has been deposited which layer in its thickness corresponds to the inner layer 22, the supply of $GeCl_4$ is stopped and undoped material continues to be built up. In this way a porous $SiO_2$ body is obtained. After the removal of the carrier the soot body thus produced is subjected to chlorine treatment at increased temperature in order to remove hydroxyl groups to a level of under 30 ppb by weight. Thereupon the porous $SiO_2$ dehydrated soot body is vitrified under formation of the substrate tube 21. The inner and outer surfaces of the substrate tube 21 are then mechanically smoothed and chemically etched.

In order to produce the preform for the optical fiber with the refractive index profile represented in FIG. 2a, the inner walls 24 of the substrate tube 21 as shown in FIG. 2b are first coated by means of the MCVD process with an undoped $SiO_2$ layer to a thickness of about 0.88 mm and at the same time directly vitrified. Then a Ge-doped layer with a thickness of 0.49 mm is produced in that $GeCl_4$ is added to the starting material. The refractive index curve in the core segment A (FIG. 2a) is produced by a corresponding concentration gradient of $GeO_2$ within the Ge-doped layer.

Then the internally coated substrate tube 21 is collapsed. The core rod thus produced has an outer diameter of 19 mm. It is then covered by an outer tube of undoped quartz glass. The preform thus produced has an outer diameter of about 103 mm. From it are drawn optical fibers having an outer diameter of 125 µm and a refractive index profile of the core region as shown in FIG. 2a.

Figure 3B:
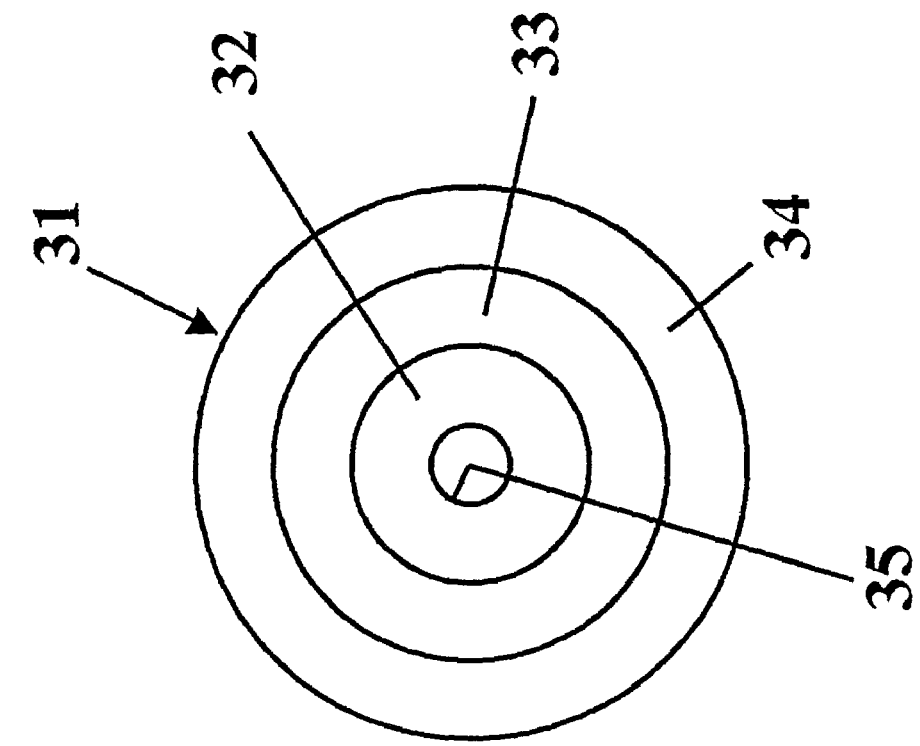
Figure 3A:
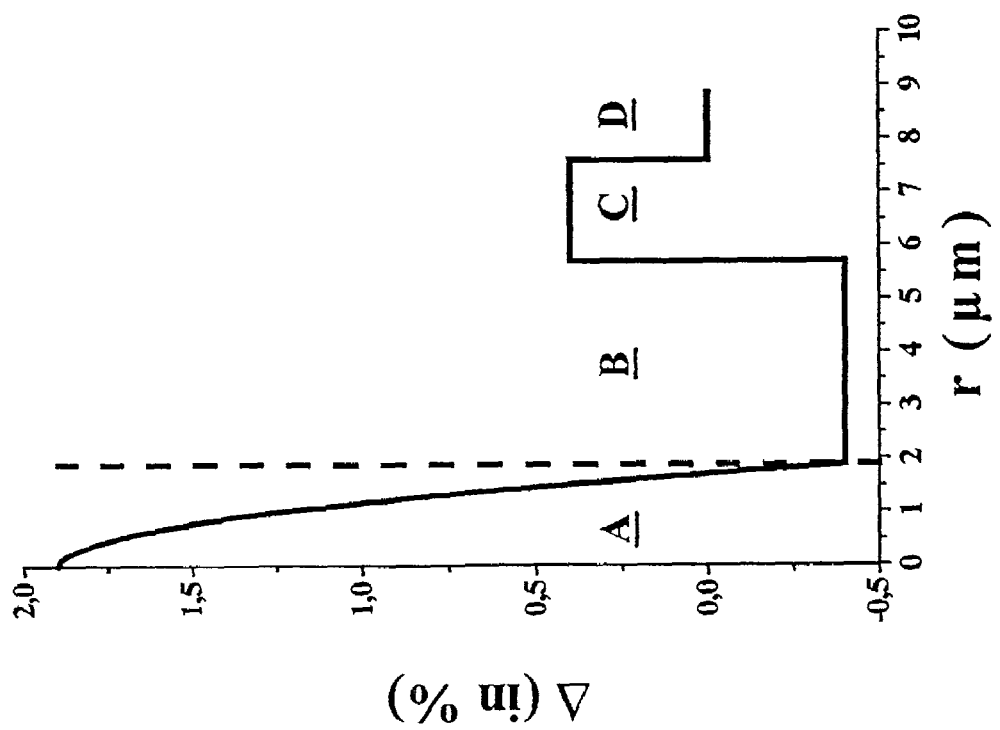

The refractive index profile shown in FIG. 3a is typical of a so-called DC fiber. Such a fiber is described in EP-A2 598,554. The DC fiber is distinguished by a strong negative dispersion at a transmission wavelength of 1550 nm. It is used in order to compensate the positive dispersion at 1550 nm of standard single mode fibers, which is put at about 17 ps/(nm·km) in the literature. In this way high transmission rates can be achieved even with standard single-mode fibers at a transmission wave length of 1550 nm.

The refractive index profile is distinguished by a total of four core segments. Within the core segment A which has diameter of about 3.8 µm (radius of 1.9 µm), the relative refractive index differential Δ declines parabolically from a maximum of Δ=1.9 to 0. In the core segment B which is disposed next in the outward direction and has a layer thickness of 3.8 µm, the relative refraction index differential is Δ=−0.4. The core segment B is followed by the core segment C which has a layer thickness of 1.9 µm and a relative refractive index differential of Δ=0.4. The relative refractive index differential of the core segment D is again 0 and the segment has a layer thickness of 1.49 µm. The core segment D is followed by the outer optical cladding region of the fiber which is composed of undoped quartz glass.

The core segments B, C and D are provided by the substrate tube according to the invention. The boundary region between the core segments A and B are indicated in FIG. 3a by a broken line.

A first embodiment of the substrate tube used for the production of the fiber with a refractive index profile according to FIG. 3a, is schematically represented in FIG. 3b. A more detailed description of the substrate tube and the method of its production follows below.

The substrate tube 31 has an outer diameter of 25 mm and a total wall thickness of 3 mm. The inner layer 32 of the substrate tube 31 is composed of fluorine-doped quartz glass which has a refractive index lower by $5.8 \times 10^{-3}$ than that of pure quartz glass. The fluorine concentration in the core segment B is approximately 2% by weight and the layer thickness is 1.19 mm. This is followed by an intermediate layer 33 doped with about 10% by weight of $GeO_2$ and also with 2% by weight of fluorine, which results in the above-mentioned increase of the normal refractive index of 0.4% in the core segment C. The layer thickness of the intermediate layer 33 is 0.95mm. The outer layer 34 of the substrate tube 31 has a layer thickness of 0.86 mm and is also composed of quartz glass doped with a mixture of fluorine and germanium whereby the fluorine concentration is 2% by weight and the $GeO_2$ concentration is 5% by weight. The refractive index-raising effect of $GeO_2$ and the refraction index-lowering effect of fluorine results, at the above-indicated concentrations of these dopants, in a refraction index change of 0 versus undoped quartz glass. In the case of the refractive index profile of the optical fiber obtained by using the substrate tube 31, the core segment B corresponds to the inner layer 32, the core segment C to the intermediate layer 33 and the core segment D to the outer layer 34.

The substrate tube 21 is produced according to the OVD process. According to the known process, $SiO_2$ particles are produced by means of flame hydrolysis of $SiCl_4$ and are deposited in layers on a rotating pin. $GeCl_4$ is added during the deposition of the intermediate layer 33 and of the outer layer 34.

Then the porous $SiO_2$ soot body is heated to a temperature of about 800° C. in a fluorine-containing atmosphere and homogeneously doped with fluorine across its entire wall thickness. At the same time this lowers the hydroxyl group content.

The porous $SiO_2$ soot body is then vitrified under formation of a hollow cylinder. The surfaces of the hollow cylinder are mechanically smoothed and then chemically etched. The hollow cylinder treated in this manner is then elongated to the final dimensions of the substrate tube.

A second embodiment of a substrate tube for the production of a fiber with a refraction index according to FIG. 3a and a process for its production will be described below in more detail.

The substrate tube has an outer diameter of 25 mm and a total wall thickness of 3 mm. The inner layer of the substrate tube is composed of fluorine-doped quartz glass which has a refractive index lower by $5.8 \times 10^{-3}$ than that of pure quartz glass. The fluorine concentration in the core segment B is approximately 1% by weight. The layer thickness is 1.19 mm. This is followed by an intermediate layer doped with about 5.4% by weight of $GeO_2$ which results in the increase of the normal refractive index of $\Delta=0.4$ in the core segment C shown in FIG. 3a The layer thickness of the intermediate layer is 0.95 mm. The outer layer of the substrate tube has a layer thickness of 0.86 mm and is composed of undoped quartz glass. In the case of the refractive index profile of the optical fiber obtained by using this substrate tube, the core segment B corresponds to the inner layer, the core segment C to the intermediate layer and the core segment D to the outer layer.

A process for the production of this embodiment of the substrate tube according to the invention will be described below. The substrate tube is produced according to the OVD process. For this, $SiO_2$ particles are produced by means of flame hydrolysis of $SiCl_4$ according to the known process and are deposited in layers on a rotating mandrel, using deposition burners. The surface temperature of the soot body being formed is about 1,400° C. during the deposition. To produce the inner layer, $SiCl_4$ is used and to it is added $GeCl_4$ during the deposition of the intermediate layer. The $GeCl_4$ supply is again stopped during the production of the outer layer. In this way is obtained a porous $SiO_2$ soot body with a germanium-doped intermediate layer. A distinctive feature of the process is that immediately before the deposition of the intermediate layer a diffusion-blocking layer with a thickness of about 0.5 mm is produced. The $SiO_2$ soot body has a higher density in the diffusion-blocking layer. This is achieved in that during the deposition of the soot layer which forms the diffusion-blocking layer, a higher surface temperature of the $SiO_2$ soot body being formed is maintained. For this the supply of fuel gases to the deposition burners is appropriately increased.

In order to produce the inner fluorine-doped layer the porous $SiO_2$ soot body is heated and a fluorine-containing gas is fed through the inner opening. The diffusion of the fluorine-containing gas into the germanium-doped intermediate layer is prevented by the diffusion-blocking layer. In this way only the inner layer is doped with fluorine, but not the intermediate layer or the outer layer. The treatment by fluorine-containing gas at the same time lowers the OH-concentration in the inner layer to a level below 50 ppb.

Then the porous $SiO_2$ soot body is vitrified under formation of the substrate tube. The surfaces of the substrate tube are mechanically smoothed and then chemically etched.

In order to produce the preform for the optical fiber with a refractive index profile shown in FIG. 3a, the core glass which forms the core segment A (FIG. 3a) is produced by internal MCVD deposition in the substrate tube. This is described below in more detail by means of FIG. 3b.

On the inner surface 35 of the substrate tube 31 according to FIG. 3b, a $SiO_2$ layer doped with $GeO_2$ is deposited by means of the MCVD process and is vitrified directly. During the deposition process the addition of $GeCl_4$ is continually increased so that a concentration profile of $GeO_2$ is established which corresponds to the parabolic refractive index profile in the core A shown in FIG. 3a. The Ge-doped layer thus produced has a thickness of 0.16 mm. The germanium concentration of the layer is maximally about 30% by weight, which leads to a refractive index increase of about $30 \times 10^{-3}$, as is shown in FIG. 3a.

Then the substrate tube produced in this manner is collapsed. The core rod thus produced has an outer diameter of 16.6 mm. It is then enclosed by an outer tube made of undoped quartz glass. The preform thus made has an outer diameter of about 114 mm. From it are drawn optical fibers with an outer diameter of 125 μm and a refractive index profile shown in FIG. 3a.

What is claimed is:

1. A process for the production of an optical fiber preform for optical data communications, said process comprising:
   providing a tubular porous $SiO_2$ blank having a first radial portion containing a first dopant that increases the refractive index of quartz glass, said providing including forming said porous $SiO_2$ blank by an outside vapor deposition (OVD) process, which includes forming the first radial portion by outside vapor deposition;
   vitrifying the tubular porous $SiO_2$ blank so as to form a substrate tube which has in the radial direction different dopants and such that the fist radial portion is formed into an inner glass layer of the substrate tube, said inner glass layer containing said first dopant and having a refraction index of at least 1.459;
   introducing in the substrate tube a core of synthetic quartz glass and collapsing the substrate tube so as to form a collapsed substrate tube containing said core; and
   placing a jacket tube around the collapsed substrate tube, and collapsing the jacket tube so as to form the optical fiber preform.

2. A process according to claim 1, wherein the inner glass layer is configured so as to adjoin the core.

3. A process according to claim 2, wherein the inner glass layer contains germanium.

4. A process according to claim 3, wherein the inner glass layer additionally contains fluorine.

5. A process according to claim 2, wherein the substrate tube comprises a cladding layer made of fluorine-doped quartz glass.

6. A process according to claim 5, wherein the inner glass layer contains germanium.

7. A process according to claim 6, wherein the inner glass layer additionally contains fluorine.

8. A process according to claim 7, wherein the inner glass layer has an index of refraction in the range from 1.4593 to 1.490.

9. A process according to claim 8, wherein the hydroxyl ion content in the inner glass layer is max. 1 ppm by weight.

10. A process according to claim 9 wherein a diffusion-blocking layer is provided adjacent to the inner glass layer.

11. A process according to claim 5, wherein the inner glass layer additionally contains fluorine.

12. A process according to claim 2, wherein the inner glass layer additionally contains fluorine.

13. A process according to claim 1, wherein the substrate tube comprises a cladding layer made of fluorine-doped quartz glass.

14. A process according to claim 13, wherein the inner glass layer contains germanium.

15. A process according to claim 14, wherein the inner glass layer additionally contains fluorine.

16. A process according to claim 13, wherein the inner glass layer additionally contains fluorine.

17. A process according to claim 1, wherein the inner glass layer contains germanium.

18. A process according to claim 17, wherein the inner glass layer additionally contains fluorine.

19. A process according to claim 1, wherein the inner glass layer contains fluorine.

20. A process according to claim 1, wherein the inner glass layer has an index of refraction in the range from 1.4593 to 1.490.

21. A process according to claim 1, wherein the hydroxyl ion content in the inner glass layer is max. 1 ppm by weight.

22. A process according to claim 1, wherein a diffusion-blocking layer is provided adjacent to the inner glass layer.

23. A process for the production of an optical fiber preform for optical data communications, said process comprising:
providing a tubular porous $SiO_2$ blank having a first radial portion containing a first dopant that increases the refractive index of quartz glass, said providing including forming said porous $SiO_2$ blank by an outside vapor deposition (OVD) process, which includes forming the first radial portion by outside vapor deposition;
vitrifying the tubular porous $SiO_2$ blank so as to form a substrate tube which has in the radial direction different dopants and such that the first radial portion of the substrate tube is formed into an inner glass layer of the substrate tube, said inner glass layer containing said first dopant and having a refraction index of at least 1.459;
depositing on the inner layer of the substrate tube a core glass of synthetic quartz glass and collapsing the substrate tube so as to form a collapsed substrate tube containing said core glass; and
placing a jacket tube around the collapsed substrate tube and collapsing the jacket tube so as to form the optical fiber preform.

24. A process according to claim 23, wherein the inner glass layer is configured so as to adjoin the core glass.

25. A process according to claim 23, wherein the substrate tube comprises a cladding layer made of fluorine-doped quartz glass.

26. A process according to claim 25, wherein the inner glass layer contains germanium.

27. A process according to claim 26, wherein the inner glass layer contains fluorine.

28. A process according to claim 27, wherein the hydroxyl ion content in the inner glass layer is max. 1 ppm by weight.

29. A process according to claim 28, wherein a diffusion-blocking layer is provided adjacent to the inner glass layer.

30. A process according to claim 27, wherein a diffusion-blocking layer is provided adjacent to the inner glass layer.

31. A process according to claim 25, wherein the inner glass layer contains fluorine.

32. A process according to claim 25, wherein a diffusion-blocking layer is provided adjacent to the inner glass layer.

33. A process according to claim 23, wherein the inner glass layer contains germanium.

34. A process according to claim 33, wherein the inner glass layer contains fluorine.

35. A process according to claim 33, wherein the hydroxyl ion content in the inner glass layer is max. 1 ppm by weight.

36. A process according to claim 33, wherein a diffusion-blocking layer is provided adjacent to the inner glass layer.

37. A process according to claim 23, wherein the inner glass layer contains fluorine.

38. A process according to claim 37, wherein the hydroxyl ion content in the inner glass layer is max. 1 ppm by weight.

39. A process according to claim 37, wherein a diffusion-blocking layer is provided adjacent to the inner glass layer.

40. A process according to claim 23, wherein the inner glass layer has an index of refraction in the range from 1.4593 to 1.490.

41. A process according to claim 23, wherein the hydroxyl ion content in the inner glass layer is max. 1 ppm by weight.

42. A process according to claim 41, wherein a diffusion-blocking layer is provided adjacent to the inner glass layer.

43. A process according to claim 23, wherein a diffusion-blocking layer is provided adjacent to the inner glass layer.

* * * * *